(12) United States Patent
Wang et al.

(10) Patent No.: US 11,522,613 B2
(45) Date of Patent: Dec. 6, 2022

(54) ADJUSTABLE BIDIRECTIONAL TRANSMISSION MICRO-OPTOELECTRONIC SYSTEM SUPPORTING ONLINE UPGRADE CONFIGURATION

(71) Applicant: HANGZHOU XIN YUN TECHNOLOGY CO., LTD, Zhejiang (CN)

(72) Inventors: Zongwang Wang, Zhejiang (CN); Xiaoliang Xia, Zhejiang (CN)

(73) Assignee: HANGZHOU XIN YUN TECHNOLOGY CO., LTD, Zhejiang (CN)

( * ) Notice: Subject to any disclaimer, the term of this patent is extended or adjusted under 35 U.S.C. 154(b) by 0 days.

(21) Appl. No.: 17/285,919

(22) PCT Filed: Mar. 6, 2020

(86) PCT No.: PCT/CN2020/078274
§ 371 (c)(1),
(2) Date: Apr. 16, 2021

(87) PCT Pub. No.: WO2020/220829
PCT Pub. Date: Nov. 5, 2020

(65) Prior Publication Data
US 2021/0351845 A1   Nov. 11, 2021

(30) Foreign Application Priority Data

Apr. 29, 2019 (CN) .......................... 201910355189.9
Apr. 29, 2019 (CN) .......................... 201920606928.2

(51) Int. Cl.
*H04B 10/27* (2013.01)
*H04B 10/25* (2013.01)
*H04B 10/50* (2013.01)
*H04J 14/02* (2006.01)

(52) U.S. Cl.
CPC ......... *H04B 10/2589* (2020.05); *H04B 10/27* (2013.01); *H04B 10/504* (2013.01); *H04J 14/0242* (2013.01)

(58) Field of Classification Search
CPC .. H04B 10/2589; H04B 10/27; H04B 10/504; H04J 14/0242
See application file for complete search history.

(56) References Cited

U.S. PATENT DOCUMENTS 7,103,279 B1 * 9/2006 Koh ..................... H04B 10/112
398/115
2008/0181282 A1 * 7/2008 Wala ................... H04W 88/085
375/130

(Continued)

FOREIGN PATENT DOCUMENTS

CN        106877936 A     6/2017
CN        107017948 A     8/2017

(Continued)

OTHER PUBLICATIONS

International Search Report for PCT/CN2020/078274 dated May 27, 2020, ISA/CN.

(Continued)

Primary Examiner — Dzung D Tran
(74) Attorney, Agent, or Firm — Yue (Robert) Xu

(57) ABSTRACT

An adjustable micro-optoelectronic system supporting bidirectional transmission, an online upgrade, and online configuration. The system includes: a substrate; and edge connectors, a clock-and-data recovery (CDR) chip for transmitting, a CDR chip for receiving, a microprocessor, and an internal optical system, which are provided on the substrate. The edge connectors serve as an interface of a high-speed electrical signal, and are configured to exchange information between the micro-optoelectronic system and an external environment. The internal optical system is (Continued)

configured to transmit and receive an optical signal. A link for the high-speed electrical signal is connected among the edge connectors, the CDR chip for transmitting, the internal optical system, and the CDR chip for receiving. A communication connection is provided between the microprocessor and each of the edge connectors, the CDR chip for transmitting, the CDR chip for receiving, and the internal optical system.

6 Claims, 1 Drawing Sheet

(56) References Cited

U.S. PATENT DOCUMENTS

| | | | | |
|---|---|---|---|---|
| 2008/0292322 | A1* | 11/2008 | Daghighian | H04B 10/40 398/192 |
| 2013/0236188 | A1* | 9/2013 | Hung | H04B 10/2575 398/116 |
| 2017/0170905 | A1 | 6/2017 | Tanaka | |
| 2017/0272845 | A1* | 9/2017 | Pezeshki | H04Q 11/0005 |
| 2019/0317285 | A1* | 10/2019 | Liff | G02B 6/2938 |

FOREIGN PATENT DOCUMENTS

| | | |
|---|---|---|
| CN | 207184497 U | 4/2018 |
| CN | 208140987 U | 11/2018 |
| CN | 110034823 A | 7/2019 |

OTHER PUBLICATIONS

The Korean 1st Office Action for Application No. KR10-2021-7004261, dated Mar. 17, 2022.

* cited by examiner

ADJUSTABLE BIDIRECTIONAL TRANSMISSION MICRO-OPTOELECTRONIC SYSTEM SUPPORTING ONLINE UPGRADE CONFIGURATION

The present application is the national phase of International Application No. PCT/CN2020/078274, titled "ADJUSTABLE BIDIRECTIONAL TRANSMISSION MICRO-OPTOELECTRONIC SYSTEM SUPPORTING ONLINE UPGRADE CONFIGURATION", filed on Mar. 6, 2020, which claims the priority to Chinese Patent Applications No. 201910355189.9 and No. 201920606928.2, both titled "ADJUSTABLE MICRO-OPTOELECTRONIC SYSTEM SUPPORTING BIDIRECTIONAL TRANSMISSION, ONLINE UPGRADE, AND ONLINE CONFIGURATION" and filed on Apr. 29, 2019 with the China National Intellectual Property Administration, all of which are incorporated herein by reference in its entirety.

FIELD

The present disclosure relates to the technical field of optical communication, and in particular to an adjustable micro-optoelectronic system supporting bidirectional transmission, an online upgrade, and online configuration.

BACKGROUND

Emerge of 5G wireless communication brings diversified services requiring a network that is more flexible, more intelligent, more integrated, and more open. Different from the 4G networks, the 5G networks necessitates re-slicing services inevitably. A base band unit (BBU) is split into two logical units, i.e. a central unit (CU) and a distributed unit (DU). A protocol and a function in and above a packet data convergence protocol (PDCP) layer are implemented by the CU, while a protocol and a function below the PDCP layer are implemented by the DU. A radio frequency unit, a part of a function of a baseband physical layer, and an antenna constitute an active antenna unit (AAU). According to a change in architecture of a 5G radio access network (RAN), a 5G bearer network include three parts, i.e., fronthaul (from AAU to DU), midhaul (from DU to CU), and backhaul (from CU to a core network). The 5G networks feature high speed, low latency, high reliability, and high-precision synchronization, which requires that all equipment related to the fronthaul, the midhaul, and the backhaul is capable to transmit a service rapidly, effectively, and with a lowest delay. In an initial stage of 5G, commercial equipment qualified for 5G deployment puts various requirements of service configuration on a micro-optoelectronic system, which serves as a key component of the AAU and the DU. In current local 5G experiments, 100G CWDM4 and 100G WDM PON are main solutions for the fronthaul. The solution of 100G CWDM4 requires lots of fiber resources, and substantially does not provide a function of an online upgrade and online configuration. Thus, it is necessary to re-plug the micro-optoelectronic system in case of an upgrade and configuration at a bottom level. The solution of 100G WDM PON requires a dedicated MAC layer and a dedicated CPRI (common public radio interface) service conversion, and does not provide a function of an online upgrade and online configuration, either.

SUMMARY

An objective of the present disclosure is to provide an adjustable micro-optoelectronic system supporting bidirectional transmission, an online upgrade, and online configuration, which addresses an issue that a micro-optoelectronic system required to be re-plugged in case of an upgrade and configuration at a bottom level hinders usage in conventional technology.

Such objective of the present disclosure is achieved through following technical solutions.

An adjustable micro-optoelectronic system supporting bidirectional transmission, an online upgrade, and online configuration is provided, including: a substrate; and edge connectors, a clock-and-data recovery (CDR) chip for transmitting, a CDR chip for receiving, a microprocessor, and an internal optical system, which are provided on the substrate; where the edge connectors serve as an interface of a high-speed electrical signal, and are configured to exchange information between the micro-optoelectronic system and an external environment; where the internal optical system is configured to transmit and receive an optical signal; where a link for the high-speed electrical signal is configured to connect the edge connectors and the CDR chip for transmitting, connect the CDR chip for transmitting and the internal optical system, connect the internal optical system and the CDR chip for receiving, and connect the CDR chip for receiving and the edge connectors; and where a communication connection is provided between the microprocessor and each of the edge connectors, the CDR chip for transmitting, the CDR chip for receiving, and the internal optical system.

The CDR chip for transmitting is configured to restore and reshape the high-speed electrical signal inputted from a single board, and transmit the high-speed electrical signal to the internal optical system. The CDR chip for receiving is configured to restore and reshape a high-speed electrical signal outputted from the internal optical system, and transmit the high-speed electrical signal to the single board through the edge connectors. The microprocessor is configured to: detect a state of the entire system, configure the transmitting CDR and the receiving CDR, configure and control the internal optical system, and communicate with an external mainboard via the edge connectors. The substrate is configured to carry the above functional modules and provide a channel for connection.

In a preferable embodiment, the internal optical system includes: a laser driver, a laser, a laser substrate, an optical filter for transmitting, a 45-degree optical reflector, a mirror, an optical filter for receiving, a photo-detector (PD) array, a trans-impedance amplifier, and a core. The laser driver is configured to drive the laser. The laser is arranged on the laser substrate. After being filtered by the optical filter for transmitting, a laser beam emitted by the laser is reflected by the 45-degree optical reflector and transmitted by the mirror, and then reaches the optical filter for receiving. The laser beam is filtered by the optical filter for receiving, and finally transmitted to the PD array. The core is in communication connection with the laser driver, the trans-impedance amplifier, and the external microprocessor. The trans-impedance amplifier is configured to amplify a signal. The core is configured to set the laser driver and detect an operation state of the laser driver, such that the laser driver operates normally. The core is further configured to set the trans-impedance amplifier and detect an operation state of the trans-impedance amplifier, such that the trans-impedance amplifier operates normally. The core is further configured to detect operations states of the laser and the PD array. The trans-impedance amplifier is configured to amplify, at a front end, a micro signal generated by the PD array. A communication interface is configured to implement communication between the microprocessor and other subsystems connected to the microprocessor, and communication with the mainboard. The PD array is configured to convert an inputted optical signal into an electrical signal, and transmit the electrical signal to the trans-impedance amplifier. The optical filter for receiving is configured to filter out undesired light by selecting a certain wavelength to pass, and thereby light for configuration is transmitted to the PD array at the receiving end. The mirror is configured to reflect incident light to the optical filter for receiving, as a collimated beam. The laser driver is configured to drive the laser to emit light normally, and modulate the laser beam based on an electrical signal. The laser substrate serves as a carrier for the laser. The optical filter for transmitting is configured to transmit the light for configuration, which is emitted by the laser, normally, and prevent other light from interfering with the laser beam. The 45-degree reflector is configured to reflect incident light to the mirror.

In a preferable embodiment, the internal optical system further includes a semiconductor thermoelectric cooler (TEC), configured to control operating temperature of the laser driver, the laser substrate, and the laser.

In a preferable embodiment, the internal optical system further includes an adaptor, configured to couple incident light into the micro-optoelectronic system, and couple emitted light into an optical fiber.

In a preferable embodiment, the micro-optoelectronic system further includes an active antenna unit (AAU) and a distributed unit (DU), which are connected via a fiber.

In a preferable embodiment, the micro-optoelectronic system is controlled by an addressing network of an upper computer.

Embodiments of the present disclosure achieve following beneficial effects.

1. The micro-optoelectronic system performs bi-directional transmission over a single fiber, thereby reducing fiber volume, and achieving arbitrary connection to the DU and the AAU.

2. The system is upgraded and configured based on a receiving end of a certain channel, and it is not necessary to provide a service terminal or re-plug the system.

3. Online upgrade, online configuration, and online management can be achieved, thereby saving labors.

DETAILED DESCRIPTION

Hereinafter the present disclosure is described clearly and completely in conjunction with the drawings and embodiments of the present disclosure.

Figure 1:
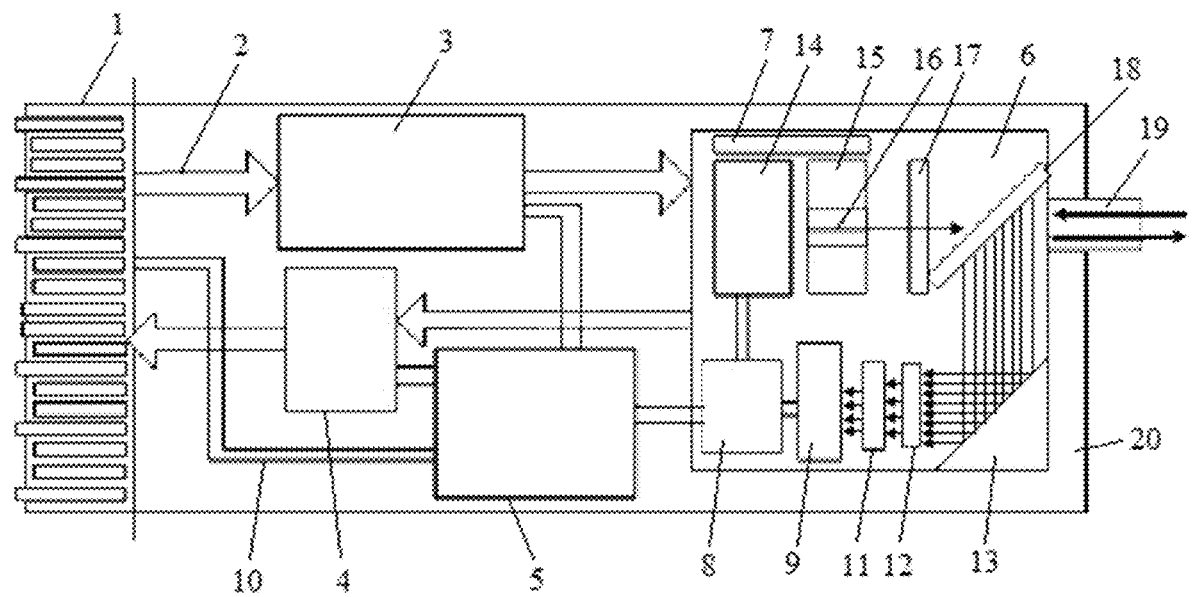
FIG. 1 is a schematic diagram of a system according to an embodiment of the present disclosure.

An adjustable micro-optoelectronic system supporting bidirectional transmission, an online upgrade, and online configuration is provided according to an embodiment. Reference is made to FIG. 1. The adjustable micro-optoelectronic system includes a substrate 20. Edge connectors 1, a clock-and-data recovery (CDR) chip 3 for transmitting, a CDR chip 4 for receiving, a microprocessor 5, and an internal optical system 6 are provided on the substrate. The edge connectors serve as an interface of a high-speed electrical signal, and are configured to exchange information between the micro-optoelectronic system and an external environment. The internal optical system is configured to transmit and receive an optical signal. A link for the high-speed electrical signal is configured to connect the edge connectors and the CDR chip for transmitting, connect the CDR chip for transmitting and the internal optical system, connect the internal optical system and the CDR chip for receiving, and connect the CDR chip for receiving and the edge connectors. A communication connection 10 is provided between the microprocessor and each of the edge connectors, the CDR chip for transmitting, the CDR chip for receiving, and the internal optical system. The internal optical system includes: a laser driver 14, a laser 16, a laser substrate 15, an optical filter 17 for transmitting, a 45-degree optical reflector 18, a mirror 13, an optical filter 12 for receiving, a photo-detector (PD) array 11, a trans-impedance amplifier 9, and a core 8. The laser driver is configured to drive the laser. The laser is arranged on the laser substrate. After being filtered by the optical filter for transmitting, a laser beam emitted by the laser is reflected by the 45-degree optical reflector and transmitted by the mirror, and then reaches the optical filter for receiving. The laser beam is filtered by the optical filter for receiving, and finally transmitted to the PD array. The core is in communication connection with the laser driver, the trans-impedance amplifier, and the external microprocessor. The trans-impedance amplifier is configured to amplify a signal. The internal optical system further includes a semiconductor thermoelectric cooler (TEC) 7. The TEC is configured to control operating temperature of the laser driver, the laser substrate, and the laser. The internal optical system further includes an adaptor 19. The adaptor is configured to couple incident light into the micro-optoelectronic system, and couple emitted light into an optical fiber.

The CDR chip for transmitting is configured to restore and reshape the high-speed electrical signal inputted from a single board, and transmit the high-speed electrical signal to the internal optical system. The CDR chip for receiving is configured to restore and reshape a high-speed electrical signal outputted from the internal optical system, and transmit the high-speed electrical signal to the single board through the edge connectors. The microprocessor is configured to detect a state of the entire system. The microprocessor configures the transmitting CDR and the receiving CDR, configures and controls the internal optical system, and communicates with an external mainboard via the edge connectors. The substrate is configured to carry the above functional modules and provide a channel for connection. The core is configured to set the laser driver and detect an operation state of the laser driver, such that the laser driver operates normally. The core is further configured to set the trans-impedance amplifier and detect an operation state of the trans-impedance amplifier, such that the trans-impedance amplifier operates normally. The core is further configured to detect operations states of the laser and the PD array. The trans-impedance amplifier is configured to amplify, at a front end, a micro signal generated by the PD array 11. A communication interface is configured to implement communication between the microprocessor and other subsystems connected to the microprocessor, and communication with the mainboard. The PD array is configured to convert an inputted optical signal into an electrical signal, and transmit the electrical signal to the trans-impedance amplifier. The optical filter for receiving is configured to filter out undesired light by selecting a certain wavelength to pass, and thereby light for configuration is transmitted to the PD array at the receiving end. The mirror is configured to reflect incident light to the optical filter for receiving, as a collimated beam. The laser driver is configured to drive the laser to emit light normally, and modulate the laser beam based on an electrical signal. The laser substrate serves as a carrier for the laser. The optical filter for transmitting is configured to transmit the light for configuration, which is emitted by the laser, normally. The optical filter for transmitting prevents other light from interfering with the laser beam. The 45-degree reflector is configured to reflect incident light to the mirror.

Figure 2:
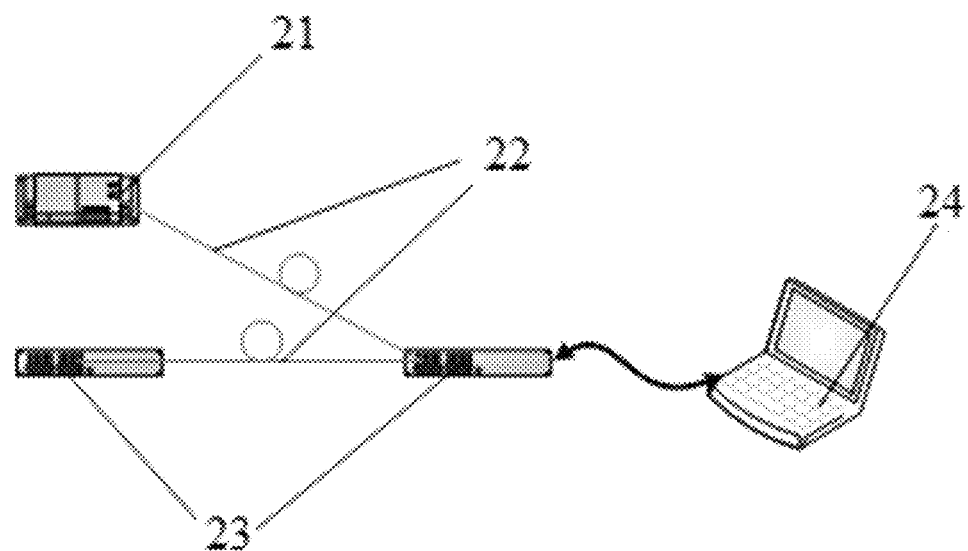
FIG. 2 is a schematic diagram of online upgrading and online configuration of the micro-optoelectronic system according to an embodiment of the present disclosure, and Reference numerals:
1. edge connectors,
2. Link for a high-speed electrical-signal link,
3. CDR (clock-and-data recovery) chip for transmitting,
4. CDR chip for receiving,
5. microprocessor,
6. internal optical system,
7. thermoelectric cooler,
8. core,
9. trans-impedance amplifier,
10. communication connection,
11. PD array,
12. optical filter for receiving,
13. mirror,
14. laser driver, -continued Reference numerals:
15. laser substrate,
16. laser,
17. optical filter for transmitting,
18. 45-degree optical reflector,
19. adaptor,
20. substrate,
21. active antenna unit,
22. fiber,
23. distributed unit, and
24. upper computer.

As shown in FIG. 2, the adjustable micro-optoelectronic system further includes an active antenna unit (AAU) and a distributed unit (DU). The AAU and the DU are connected via a fiber 22. The micro-optoelectronic system is controlled by an addressing network of the upper computer 24. A principle of 5G fronthaul is as follows. As an uplink, the AAU at a terminal converts a received radio-frequency signal into multiple channels of optical signals, according to the eCPRI protocol. The multiple channels of optical signals are combined via a multiplexer (MUX), and then transmitted over the fiber to a de-multiplexer (DMUX) at a local end for separation. Each separated optical signal is transmitted to the DU at the local end. The DUs form a DU ring. As a downlink, the DUs at the local end convert a downlink signal into multiple channels of optical signals. The multiple channels of optical signals are combined via a MUX, and then transmitted over the fiber to a DMUX at the terminal for separation. Each separated optical signal is transmitted to the AAU at the terminal, and then the optical signal is transmitted as a wireless signal.

The upper computer configures and manages the entire system through a networking cable. The upper computer can address, via the cable, each micro-optoelectronic system plugged into the AAU or the DU. In a case that a micro-optoelectronic system on the AAU or the DU is to be upgraded or configured, it is not necessary to remove the micro-optoelectronic system from the AAU or the DU. Instead, only a channel is occupied in the fiber, where information of the upgrade or the configuration is packaged and sent to such micro-optoelectronic system in a specific data format. The micro-optoelectronic system is provided with a program that matches the data format. When receiving data, the micro-optoelectronic system determines whether the data is of a common communication service, or of an upgrade or configuration for the system. In a case the data is of the upgrade or the configuration, the micro-optoelectronic system interrupts the corresponding link automatically while not interrupting communication services in other links. Content of the upgrade or configuration is written into the micro-optoelectronic system via such link. Embodiments of the present disclosure implements an online upgrade and online configuration based on an adjustable micro-photoelectric system which supports bi-directional transmission. An object of the upgrade includes, but is not limited to, a bottom-level driver, register information, a block of user information, or the like. An object of the configuration includes, but is not limited to, wavelength adjustment, debugging on a private register, and performance adjustment on certain functional modules of the system. The online upgrade and the online configuration may be implemented through a receiving end as described above, or through an electrical interface of the edge connectors. A specific manner of implementation may be flexibly adjusted according to a requirement of a practical application scenario.

The forgoing embodiments are only preferable solutions of the present disclosure, and do not limit the present disclosure in any form. There may be other variations and modifications not exceeding technical solutions described in the claims.

The invention claimed is:

1. An adjustable micro-optoelectronic system, supporting bidirectional transmission, an online upgrade, and online configuration, wherein the adjustable micro-optoelectronic system comprises:
   a substrate; and
   edge connectors, a clock-and-data recovery (CDR) chip for transmitting, a CDR chip for receiving, a microprocessor, and an internal optical system, which are provided on the substrate;
   wherein the edge connectors serve as an interface of an electrical signal, and are configured to exchange information between the micro-optoelectronic system and an external environment;
   wherein the internal optical system is configured to transmit and receive an optical signal;
   wherein a link for the electrical signal is configured to connect the edge connectors and the CDR chip for transmitting, connect the CDR chip for transmitting and the internal optical system, connect the internal optical system and the CDR chip for receiving, and connect the CDR chip for receiving and the edge connectors; and
   wherein a communication connection is provided between the microprocessor and each of: the edge connectors, the CDR chip for transmitting, the CDR chip for receiving, and the internal optical system;
   wherein the internal optical system comprises:
      a laser substrate;
      a laser arranged on the laser substrate, wherein the laser is configured to emit a laser beam;
      a laser driver, configured to drive the laser;
      an optical filter for transmitting, configured to filter the laser beam;

a 45-degree optical reflector, configured to reflect the laser beam filtered by the optical filter for transmitting;

a mirror, configured to reflect the laser beam reflected by the 45-degree optical reflector;

an optical filter for receiving, configured to filter the laser beam reflected by the mirror;

a photo-detector (PD) array, configured to receive the laser beam filtered by the optical filter for receiving;

a core, in communication connection with the laser driver, the trans-impedance amplifier, and the external microprocessor; and a trans-impedance amplifier, configured to amplify a signal.

2. The adjustable micro-optoelectronic system according to claim 1, wherein the internal optical system further comprises:

a semiconductor thermoelectric cooler (TEC), configured to control operating temperature of the laser driver, the laser substrate, and the laser.

3. The adjustable micro-optoelectronic system according to claim 2, wherein the internal optical system further comprises:

an adaptor, configured to couple incident light into the micro-optoelectronic system, and couple emitted light into an optical fiber.

4. The adjustable micro-optoelectronic system according to claim 1, wherein the internal optical system further comprises:

an adaptor, configured to couple incident light into the micro-optoelectronic system, and couple emitted light into an optical fiber.

5. The adjustable micro-optoelectronic system according to claim 1, further comprising:

an active antenna unit (AAU) and a distributed unit (DU), which are connected via a fiber.

6. The adjustable micro-optoelectronic system according to claim 5, wherein:

the adjustable micro-optoelectronic system is controlled by an addressing network of an upper computer.

* * * * *